United States Patent
Sundaram

(10) Patent No.: US 10,657,577 B2
(45) Date of Patent: May 19, 2020

(54) METHOD AND SYSTEM FOR AUTOMATIC END-TO-END PREPARATION AND MANAGEMENT OF FOOD

(71) Applicant: Vishnu Gurusamy Sundaram, Bangalore (IN)

(72) Inventor: Vishnu Gurusamy Sundaram, Bangalore (IN)

(73) Assignee: VISHNU GURUSAMY SUNDARAM, Karnataka (IN)

( * ) Notice: Subject to any disclaimer, the term of this patent is extended or adjusted under 35 U.S.C. 154(b) by 379 days.

(21) Appl. No.: 15/299,856

(22) Filed: Oct. 21, 2016

(65) Prior Publication Data

US 2017/0116661 A1   Apr. 27, 2017

(30) Foreign Application Priority Data

Oct. 21, 2015   (IN) ............................ 5034/CHE/2015

(51) Int. Cl.
  *G06Q 30/06* (2012.01)
  *G06Q 10/08* (2012.01)
  *H04L 29/08* (2006.01)
  *G06Q 50/12* (2012.01)

(52) U.S. Cl.
  CPC ....... *G06Q 30/0633* (2013.01); *G06Q 10/087* (2013.01); *H04L 67/12* (2013.01); *G06Q 50/12* (2013.01)

(58) Field of Classification Search
  CPC ................................................. G06Q 30/0633
  USPC ....................................................... 705/26.8
  See application file for complete search history.

(56) References Cited

U.S. PATENT DOCUMENTS

| | | | | |
|---|---|---|---|---|
| 5,386,762 A * | 2/1995 | Gokey | ................ | A47J 27/14 414/225.01 |
| 7,325,485 B2 * | 2/2008 | Carhuff | ................ | A47J 31/401 134/169 R |
| 7,762,181 B2 * | 7/2010 | Boland | ................ | A47J 31/40 99/321 |
| 8,276,505 B2 * | 10/2012 | Buehler | ................ | A23L 5/10 99/326 |
| 8,672,187 B2 * | 3/2014 | Ophardt | ................ | A47K 5/1217 222/145.5 |
| 2006/0293968 A1 * | 12/2006 | Brice | ................ | B62B 3/1424 705/14.63 |

(Continued)

*Primary Examiner* — Alexis M Casey
(74) *Attorney, Agent, or Firm* — Barry Choobin; Patent 360 LLC

(57) ABSTRACT

The embodiments herein provide a method and system for providing an integrated cooking machine, which automates the process of cooking completely and support connected operation in the cooking such as share recipes, order recipes and even support connecting with the ingredient supplier ecosystem for ordering the required items. Thereby eliminating several food processing machines and even to the extent of removing kitchen in a house. The system includes electro-mechanical components for performing the cooking operation, which is driven by electronic circuits fed by programs that make this operation happen. The programs are stored in the device or downloaded from the cloud platform, which authenticates these machines and provide the required information. The system also has intuitive interface on the device to create recipes. The system is also configured to measure the output parameters of the food.

9 Claims, 10 Drawing Sheets

(56) References Cited

U.S. PATENT DOCUMENTS

2015/0290795 A1* 10/2015 Oleynik ................. B25J 9/0081
  700/257
2016/0081515 A1* 3/2016 Aboujassoum ......... A47J 36/00
  426/231
2016/0235239 A1* 8/2016 Patadia ................... A47J 44/00

* cited by examiner

METHOD AND SYSTEM FOR AUTOMATIC END-TO-END PREPARATION AND MANAGEMENT OF FOOD

CROSS-REFERENCE TO RELATED APPLICATION

The present application claims the priority of the Indian Provisional Patent Application with 5034/CHE/2015 filed on Sep. 21, 2015 and subsequently postdated by 1 month Oct. 21, 2015 with the title, "A METHOD AND A SYSTEM FOR COOKING BY COMMUNITY PROGRAMMED INSTRUCTIONS" and the contents of which is included entirely as reference herein.

BACKGROUND

Technical Field

The embodiments herein are generally related to management and preparation of food. The embodiments herein are particularly related to a system for automated management of food and food ingredients. The embodiments herein are more particularly related to a system for automatic end-to-end preparation and management of food. The embodiments herein are also related to a system to monitor food intake pattern of users and automatically prepare food based on diet needs of users.

Description of the Related Art

Cooking food has always been a task handled by humans, although various machines, tools and equipments assist humans in cooking food. Apart from the actual process of cooking food, there is a plurality of processes involved in producing food, right from procuring the ingredients for cooking to preparing food as per the need of every person.

Currently, a plurality of appliances and machines aid humans in preparing food by assisting humans in tasks such as crushing, grinding, cutting and the like. Existing assistive solutions are just food processing machines, in most cases standalone devices that perform a very specific task. However, human actions and decisions are necessary to complete the actual task of end-to-end cooking. At present, there is no automatic systems that manage end-to-end preparation and management of food.

Hence, there is a need for an intelligent system to replace any human intervention in the process of preparation of food. There is also a need for a system to manage end-to-end management of food preparation and all the activities related to food preparation and management.

The abovementioned shortcomings, disadvantages and problems are addressed herein and which will be understood by reading and studying the following specification.

OBJECT OF THE EMBODIMENTS HEREIN

The primary object of the embodiments herein is to provide a system for automatic end-to-end preparation and management of food.

Another object of the embodiments herein is to provide a platform, for integrating various discrete food processing components and computing applications to completely automate the process of cooking as per the requirements and needs of a user.

Yet another object of the embodiments herein is to maintain an inventory of cooking items.

Yet another object of the embodiments herein is to decide time of reordering items, replenishing ingredients, ordering food automatically, to enable the material suppliers to refill, and the like.

Yet another object of the embodiments herein is to provide a storage for a plurality of types of ingredients.

Yet another object of the embodiments herein is to provide a method and a system that leverages on the processing power, connectivity features, vision, hearing capabilities and other monitoring capabilities of an external computing system such as a mobile phone.

Yet another object of the embodiments herein is to provide a method and system for creating a machine that is configured to be agile during a selection menu such as boiled milk in the morning, fruit salad for appetizer, bread and baked beans for breakfast, and a fruit juice after that for a day.

Yet another object of the embodiments herein is provide a packaged food for lunch such as fried rice, boiled vegetables, etc., and keep the food ready for dinner like Pizza, etc.

Yet another object of the embodiments herein is to provide an automatic cooking appliance that is agile and executes the instructions required for preparing variety of foods and preserve them.

Yet another object of the embodiments herein is to provide a method and system that maintains the inventory of the cooking items, and decides a time of reordering provisions, replenishing the ingredients, and ordering food automatically, to enable the material suppliers/providers to refill, and the like.

Yet another object of the embodiments herein is to provide a cooking appliance that stores a plurality of mutually different ingredients in a mutually different way.

Yet another object of the embodiments herein is to store the processed food in a different manner. The automatic cooking appliance is designed to store a plurality of processed foods such as boiled milk, ice creams, fried rice, and the like. The cooking appliance is automated and is provided with (artificial) intelligence to cater the changing requirements.

Yet another object of the embodiments herein is to understand the patterns of eating, selecting or estimating the required ingredients, calculating a time or period of ordering and placing an order for the required ingredients.

Yet another object of the embodiments herein is to normalize the cooking instructions to be understood by a plurality of users at a plurality of geographical locations.

Yet another object of the embodiments herein is to provide a software and cloud platform for enabling users to create and store recipes, share the recipes, and monetize from them.

Yet another object of the embodiments herein is to provide a possibility of operating a restaurant virtually.

Yet another object of the embodiments herein is to provide a machine to keep track of the calories in the cooked food to decide missing the nutrients, for recommending a suitable and appropriate kind of food for the future meals or subsequent meals.

Yet another object of the embodiments herein is to understand a health condition of the user to estimate the required ingredients for use with a given user. For e.g. the machine is configured to use lower sugar ingredients when the user is a diabetic person.

Yet another object of embodiments herein is to utilize the appliance of the same design to prepare personalized medication using formula (i.e., recipe in the cooking world) instead of generic formula prescription drugs.

Yet another object of embodiments herein is to build a complete home without a kitchen by replacing a kitchen with a small appliance that is placed in any room.

These and other objects and advantages of the embodiments herein will become readily apparent from the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system for automatic end-to-end preparation and management of food. The embodiments also provide a system to monitor food intake pattern of users and automatically prepare food based on diet needs of users.

According to an embodiment herein, an automatic food preparation and management system that is distributed across a plurality of geographic locations is provided. The system comprises a hardware processor, a memory module, an analytics module, a plurality of end-point devices, a cloud computing module, a communication module, a sensors module, an inventory management module, and a recipe and menu building module. The memory module comprises a plurality of connected digital data storage devices and comprises digital data of the automatic food preparation and management system. The analytics module is stored in the memory module. The end-point devices comprise kitchen appliances and food processing machines located in a plurality of geographical locations. The cloud computing module connects a plurality of remotely located end-point devices. The communication module enables communication between a plurality of end-point devices. The sensors module comprises a plurality of sensors connected to the analytics module, the cloud computing module and the communication module. The inventory management module is connected to the analytics module, the cloud computing module and the communication module. The recipe and menu building module is connected to the analytics module, the cloud computing module and the communication module.

According to an embodiment herein, an analytics module is run on the processor. The analytics module is configured to analyze the inputs from a plurality of sensors and end-point devices. The analytics module is further configured to decide the type of food to be prepared by the system based on the inputs from the plurality of sensors and end-point devices. The analytics module is configured to send instructions to the plurality of end-point devices through the communication module.

According to an embodiment herein, a plurality of end-point devices are provided. The plurality of end-point devices comprise kitchen appliances that are connected to the cloud computing module. The plurality of end point devices are configured to receive instructions from the analytics module for cooking food. All the end-point devices are configured to work independently and in coordination with other end-point devices.

According to an embodiment herein, the plurality of end-point devices are provided with add-on modules that enable the end-point devices to connect to the system through the cloud computing module.

According to an embodiment herein, the sensors module comprises a plurality of sensors that measure an availability of ingredients to cook food. The sensors module also comprises a plurality of sensors that measure the food and nutrition intake of a plurality of humans and provide the information about the food and nutrition intake to the cloud computing module.

According to an embodiment herein, the plurality of sensors comprise audio, visual and biometric sensors that are configured to communicate the sensor output to the cloud computing module.

According to an embodiment herein, an inventory management module is run on the hardware processor. The inventory management module is configured to manage the availability of a plurality of ingredients for preparation of food. The inventory management module is also configured to receive the information regarding an availability of ingredients in a plurality of storage locations through the sensors module. The inventory management module is configured to receive the information regarding a type of food the system is scheduled to cook and automatically alert the end-point devices about the availability of the ingredients.

According to an embodiment herein, the inventory management module is configured to order the ingredients through online e-commerce websites and specify the location to which the ingredients are to be delivered.

According to an embodiment herein, the recipe and menu building module is run on the hardware processor. The recipe and menu building module is configured to receive the information regarding a food intake pattern of a user, an amount of nutrients taken by the user and the vital health parameters of the user through a plurality of sensors that are remotely located and connected to the cloud computing module.

According to an embodiment herein, the recipe and menu building module is configured to receive the information about the availability of ingredients at the location of the users and prepare a personalized menu of food to be prepared for every user depending on the availability of ingredients and the health parameters of the user. The recipe and menu building module is configured to provide the recipe of the food to be prepared and the instructions of preparing the food to the end-point devices through the analytics module.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
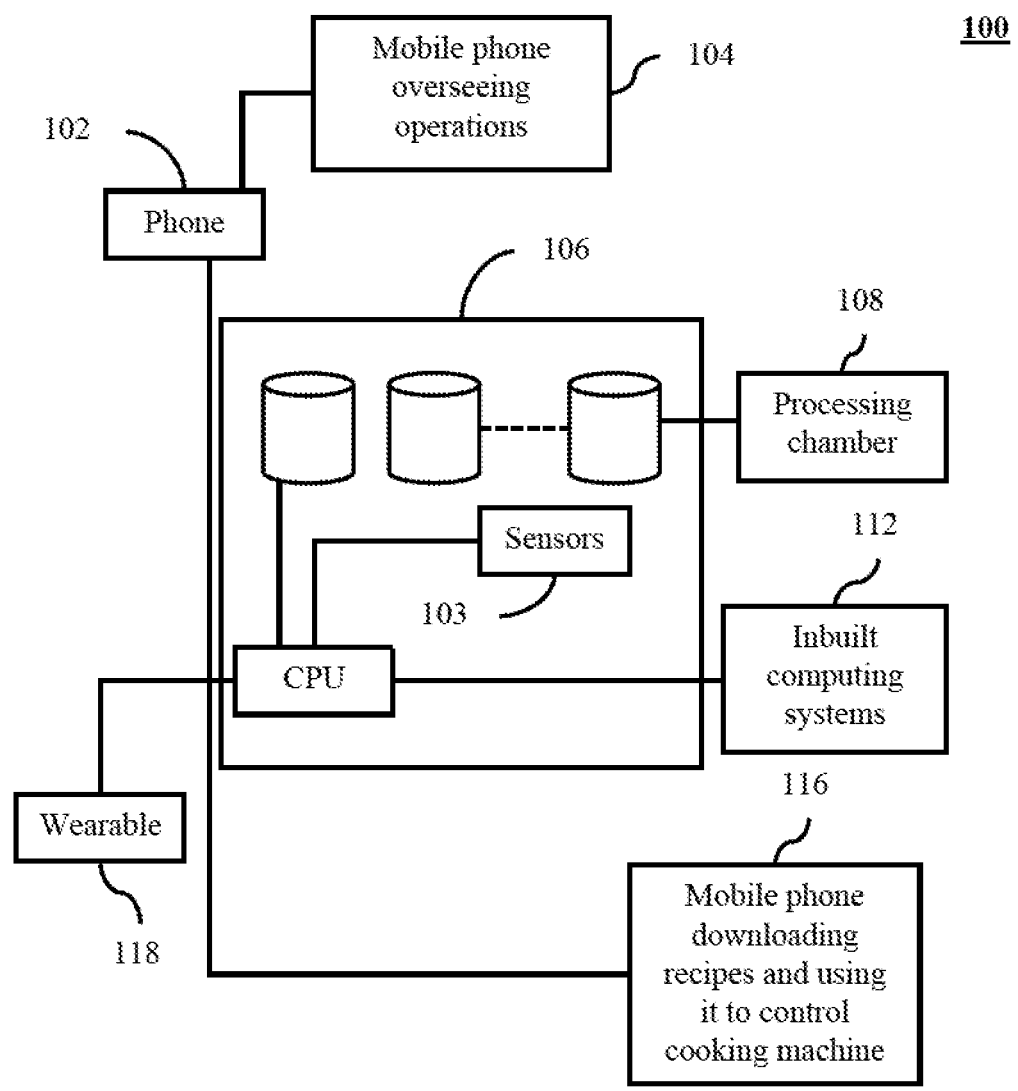
FIG. 1 illustrates a block diagram of an appliance environment, according to one embodiment of the embodiments herein.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for automatic end-to-end preparation and management of food. The embodiments also provide a system to monitor food intake pattern of users and automatically prepare food based on diet needs of users.

According to an embodiment herein, an automatic food preparation and management system that is distributed across a plurality of geographic locations is provided. The system comprises a hardware processor, a memory module, an analytics module, a plurality of end-point devices, a cloud computing module, a communication module, a sensors module, an inventory management module, and a recipe and menu building module. The memory module comprises a plurality of connected digital data storage devices and comprises digital data of the automatic food preparation and management system. The analytics module is stored in the memory module. The end-point devices comprise kitchen appliances and food processing machines located in a plurality of geographical locations. The cloud computing module connects a plurality of remotely located end-point devices. The communication module enables communication between a plurality of end-point devices. The sensors module comprises a plurality of sensors connected to the analytics module, the cloud computing module and the communication module. The inventory management module is connected to the analytics module, the cloud computing module and the communication module. The recipe and menu building module is connected to the analytics module, the cloud computing module and the communication module.

According to an embodiment herein, an analytics module is run on the processor. The analytics module is configured to analyze the inputs from a plurality of sensors and end-point devices. The analytics module is further configured to decide the type of food to be prepared by the system based on the inputs from the plurality of sensors and end-point devices. The analytics module is configured to send instructions to the plurality of end-point devices through the communication module.

According to an embodiment herein, a plurality of end-point devices are provided. The plurality of end-point devices comprise kitchen appliances that are connected to the cloud computing module. The plurality of end point devices are configured to receive instructions from the analytics module for cooking food. All the end-point devices are configured to work independently and in coordination with other end-point devices.

According to an embodiment herein, the plurality of end-point devices are provided with add-on modules that enable the end-point devices to connect to the system through the cloud computing module.

According to an embodiment herein, the sensors module comprises a plurality of sensors that measure an availability of ingredients to cook food. The sensors module also comprises a plurality of sensors that measure the food and nutrition intake of a plurality of humans and provide the information about the food and nutrition intake to the cloud computing module.

According to an embodiment herein, the plurality of sensors comprise audio, visual and biometric sensors that are configured to communicate the sensor output to the cloud computing module.

According to an embodiment herein, an inventory management module is run on the hardware processor. The inventory management module is configured to manage the availability of a plurality of ingredients for preparation of food. The inventory management module is also configured to receive the information regarding an availability of ingredients in a plurality of storage locations through the sensors module. The inventory management module is configured to receive the information regarding a type of food the system is scheduled to cook and automatically alert the end-point devices about the availability of the ingredients.

According to an embodiment herein, the inventory management module is configured to order the ingredients through online e-commerce websites and specify the location to which the ingredients are to be delivered.

According to an embodiment herein, the recipe and menu building module is run on the hardware processor. The recipe and menu building module is configured to receive the information regarding a food intake pattern of a user, an amount of nutrients taken by the user and the vital health parameters of the user through a plurality of sensors that are remotely located and connected to the cloud computing module.

According to an embodiment herein, the recipe and menu building module is configured to receive the information about the availability of ingredients at the location of the users and prepare a personalized menu of food to be prepared for every user depending on the availability of ingredients and the health parameters of the user. The recipe and menu building module is configured to provide the recipe of the food to be prepared and the instructions of preparing the food to the end-point devices through the analytics module.

FIG. 1 is a schematic illustrating multiple levels of barrel architecture. According to embodiments herein, the figure illustrates high-level parts of the system and the interaction of the system with internal and external peer systems.

The first level has the raw ingredients whereas the last level has the ready to consume food. The intermediate levels have food, which is being processed or stored. Each of these barrels have sensors, which report on the temperature, quantity, weight, texture, and the like. These barrels dispense content or go into processing chambers. The processing chambers perform a variety of operations like cleaning, boiling, deep-flying, spraying, fermenting, refrigerating, reheating, mixing, and the like.

There are also special purpose chambers that are used for sensing the quality or quantity of the operation such as a visual camera inspection chamber, which is configured to see the food to decide on the next course of action.

This whole set of chambers are controlled by programs. A typical example of the program is as follows: Take 200 grams of Rice cereal (Step 1), Mix with 200 ml of water (Step 2), Boil for 6 minutes in a cooker at 100 degree C. (Step 3), Check if the pressure has reached 100 units (Step 4), Store this for a while in a bin (Step 5), Take 4 pieces of tomatoes or 100 grams whichever is higher (Step 6), Cut the tomato into slices (Step 7), Fry the tomatoes in a vessel and hold in a bin (Step 8), Take 2 pieces of chilly or 10 grams (Step 9), Cut the chilly into minced paste (Step 10), Spray 5 grams of salt (Step 11), Spray 5 grams of pepper (Step 12), Mix this with the bin containing tomatoes (Step 13), Fry again for 5 minutes (Step 14). Mix this with the bin containing the rice (Step 15), Slowly heat the mixture for 15 minutes with a mixing operation at 80 degree C. (Step 16), Visually check if the mixing is fine (Step 17), Assess the ingredients to get the level of calories, fat sugar by taking a small sample (Step 18), Redo any procedure to reach to perfect proposition (Step 19), Store for up to 3 hours in low heat 50 degrees (Step 20) and if beyond 3 hours term the food to be inedible (Step 21).

The machine is capable of identifying the parallel paths and perform the cooking operation faster.

The machine is configured to convert these into operations involving barrels and chambers as follows:

According to an embodiment herein, the Step 1 is broken Down Into, Load Barrel B41 (Containing rice) (Step 1a), Move B41 to operation chamber OC10 in the input side, which is configured to dispense the right quantity (Step 1b), Load empty Intermediate Processing Barrel IPB1 (Step 1c), Move IPB1 to OC2, which is configured to wash it (Step 1d), Move IPB1 to OC1, which is configured to visually check for cleanliness (Step 1e), Move IPB1 to the output side of the OC10 (Step 1f), Perform the operation on OC10 to dispense 200 grams (Step 1g), and Verify weight with load cell on OC10 if available (Step 1h).

According to an embodiment herein, the Step 2 is broken down into Load Barrel B1 (Containing water) (Step 2a), Move OC11 chamber into CC1, which is chamber for cleaning operation chambers (Step 2b), Perform cleaning operation on CC11 (Step 2c), Move B1 to operation chamber OC11 in the input side, which is configured to dispense the right quantity of liquids (Step 2d), Move IPB1 to the output side of the OC11 (Step 2e), and Perform the operation on OC10 to dispense 200 ml (Step 2l).

According to an embodiment herein, the step 3 is broken down into Move OC12 chamber (which is for boiling) into CC1, which is chamber for cleaning operation chambers (Step 3a), Perform cleaning operation on CC12 (Step 3b), Move IPB1 into CC12 (Step 3c), and Perform the operation of boiling at set temperature for 6 minutes (Step 3d).

The above is just few steps being elaborated, essentially the machine is configured to break down the operation into the processing steps using intermediate barrels, storing barrels and processing chambers.

With respect to FIG. 1, the system includes the cooking machine 106, the processing chambers 108, the sensors 103, the mobile phone 102, the wearable device 118, and the inbuilt computing device 112.

According to an embodiment herein, the cooking machine 106 has multiple processing chambers. The processing chambers 108 allow the ingredients to be processed, moved from one chamber to the next, based on conditions such as time, input from sensors. Multiple chambers are required if the preparation is staged. Further, the sensors 103 assist the machine to determine one or more of the following features of the material in the chambers—colour, temperature, texture, liquidity, solidity, weight, permeability, viscosity, pressure, etc.

According to an embodiment herein, the mobile phone 102 through an application for cooking machine controls the machine, both as a user and as a programmer. In a low-end machine, where the computing power is limited, the mobile phone 102 stores all the recipe information and send only processed instructions to the cooking machine. Further, the user has an option to use another computing device such as a watch to monitor the status of the device.

According to an embodiment herein, the processing power on the machine allows it to communicate with external world, devices and control the preparation of the food according to the inputs of the user. In some cases, this processing power is leveraged from phone where the recipe management logic sits on the phone and only machine has limited capabilities to execute the processing instructions from the phone.

The system is configured to also order whenever the barrels nm out of items. It is configured to queue items and intelligently order once in preferred batches.

According to one embodiment herein, the system is provided or fitted with an outside/external facing portion for replenishing the ingredients and also for external cleaning.

Figure 2:
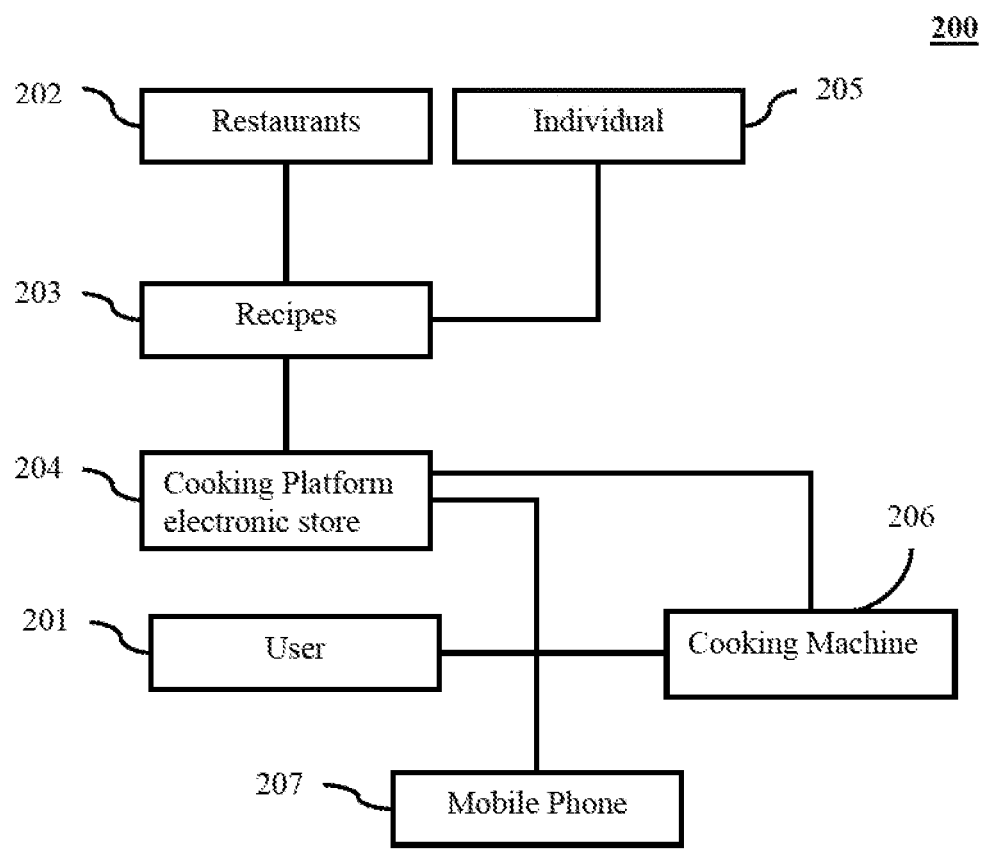
FIG. 2 illustrates a block diagram of a mobile phone and the interface on the cooking machine to choose the recipe, according to an embodiment of the embodiments herein.

FIG. 2 illustrates a block diagram representing the usage of a mobile phone and the interface on the cooking machine to choose the recipe, according to an embodiment herein.

According to an embodiment herein, the recipes are chosen from an e-store, and the dish is prepared on the machine automatically. The interface to the machine (on the machine or on phone) allows user to select the recipes that are compatible to his machine and gives the user a choice of selecting recipes that are prepared within constraints.

As illustrated in FIG. 1, there are multiple processing chambers. Each processing chamber is configured to apply a particular effect on the preparation such as heating, cooling, microwaving, etc. According to the programmed instructions, the contents from different cartridges are unloaded into the vessels and the vessel with the contents goes through different chambers during the cooking process. There are finite number of vessels and each of the vessel is configured to advertise its capabilities to the master controller.

According to an embodiment herein, the system is configured to capture the aspect of using data from various wearable devices that user uses and the wearable devices are configured to capture data such as ECG, BP, blood sugar level, stress level, oxygen saturation level, mood, etc., and use this for making selection of the food items. For example, when BP is higher, a recipe with lesser salt is chosen for preparing food for the user.

With respect to FIG. 2, the block diagram includes the restaurant 202 that has an e-store on cooking machine commerce platform. The recipes 203 are set of instructions for preparing the food item, pre-requisite list of ingredients, constraints such as time, machine features required, version of software, along with user understandable description and pricing which is free or paid.

The block diagram further includes the electronic store platform 204 that allows not only restaurants but also even individuals to publish cooking recipes. This platform allows the users to have unlimited access to the free recipes, whereas controlled access to the paid ones. The control is either time limited subscriptions or per-use or per-store exclusive access or per-family subscriptions, etc.

A plurality of individuals 205 also collaborate on the platform to create the recipe together and share the credits both fame and monetary aspects. These are created in the programming mode of cooking machine, where users define each step that the machine has to take.

According to an embodiment herein, the cooking machine 206 is directly connected to the platform via internet/other network mediums, or connected via the mobile phone, where the phone acts as the gateway storing the recipe information. The mobile phone 207 has an app, which connects to the e-store and downloads the catalogue of recipes, allows users to access free recipes and purchase subscription to paid recipes. Mobile phone app is configured to also store the recipes, without burdening the cooking machine if chosen by the user.

Figure 3:
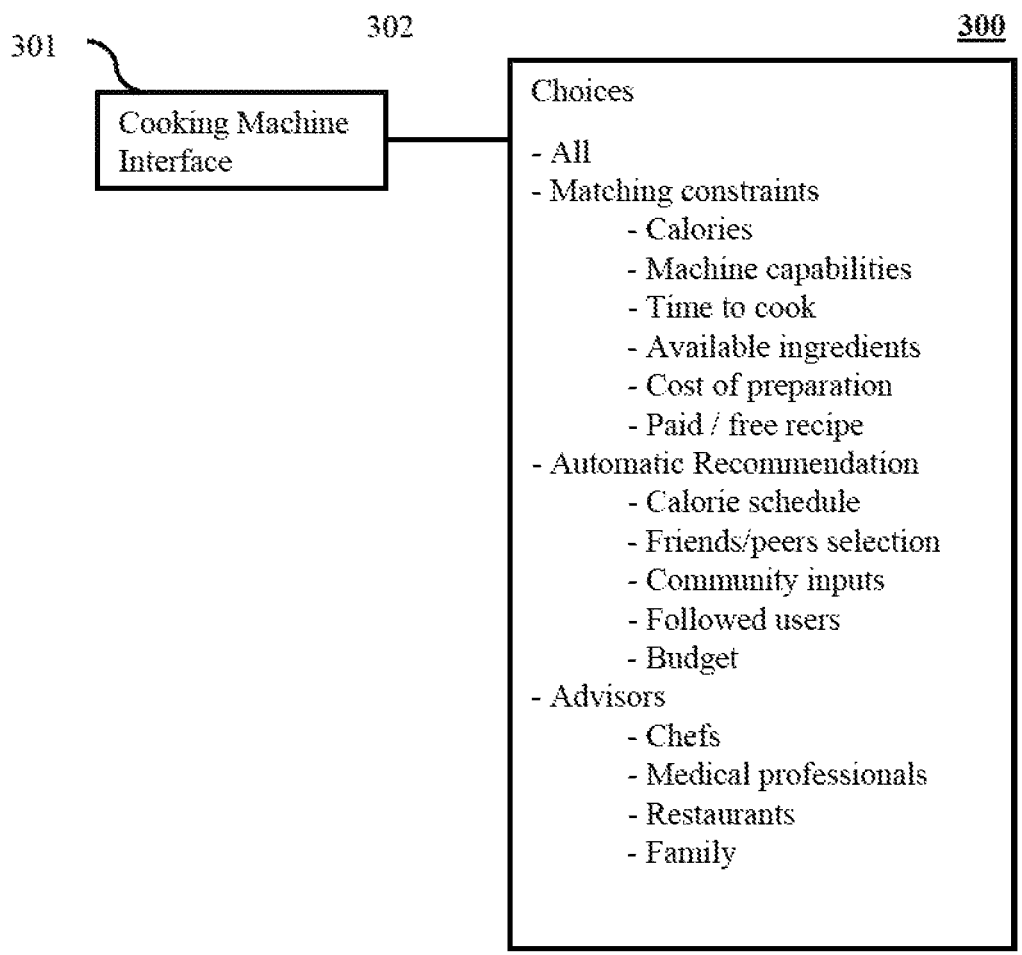
FIG. 3 illustrates a block diagram of a user interface for selecting an item for preparation, according to an embodiment of the embodiments herein.

FIG. 3 illustrates selection of an item for preparation, according to an embodiment herein. The user 301 who access the cooking machine interface via the mobile app or by using the interface available on the machine. A user also allows the machine to auto choose based on the constraints in 302. The user of the cooking machine 302 has an interface to choose the recipes to be prepared on his appliance. This interface allows him to choose a recipe, based on several categories such, but not limited to the ones listed in 302. According to an embodiment herein, the user has the option of choosing it free from the overall list available to his machine. User also searches for the ones he is looking for based on all recipe metadata.

According to an embodiment herein, the matching constraints allows user to filter down to a small subset so that the user is enabled to choose. Further, the automatic recommendation allows user to auto-select or narrow down to a very small subset based on recommendation from platform. This relies on profile data of the user on the cloud along with his social information and/or medical information. According to an embodiment herein, the advisors are a set of users who is enabled to manage the diet plan of the user by controlling the choice. These advisors optionally charge the user a subscription free. For example, a dietician is enabled to manage all the recommendations suiting the medical profile of a user.

Figure 4:
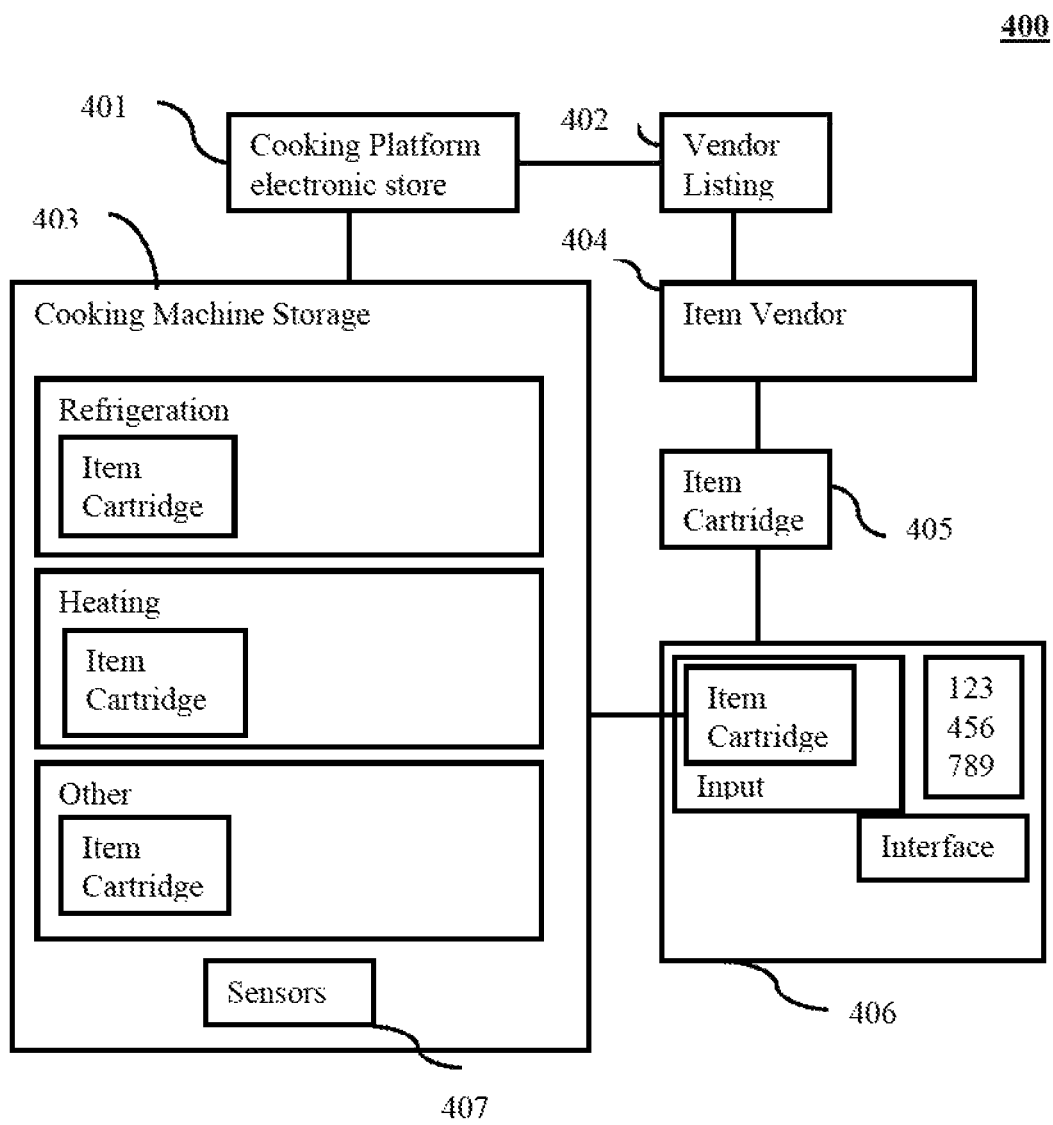
FIG. 4 illustrates block diagram of a system for taking the inventory and maintaining inventory for food preparation, according to an embodiment of the embodiments herein.

FIG. 4 illustrates ordering the inventory and maintaining inventory for food preparation, according to an embodiment herein. The 406 depicts the external facing side of the cooking machine that is configured to be accessed from outside the house/office. According to an embodiment herein, the user has an option to override the process of automatic ordering via manually procuring and feeding the content and information associated with the content.

According to an embodiment herein, the ingredient storage system 403 enables machine to order, store and dispose the ingredients based on the requirement and the condition of the ingredients. Each ingredient storage conditions and instructions to store is understood from the cloud and information available from the vendor such as days since packed, best before use, etc. Based on the prescribed instructions moves the content to different areas to maintain them at appropriate condition such as temperature.

According to an embodiment herein, the vendor 404 supplies the ingredients required for food preparation. He ships the items in a cartridge that is automatically inserted and understood by the system. In some cases, the vendor also physically transports these contents and feeds them into the external facing side of the cooking machine so that no user intervention is required.

Further, the vendor lists the availability of ingredients 402 with details including cost, time to ship, cost of shipping, packing date, expiry date, condition, colour, and the like. This allows the machine to order automatically or through the user intervention.

The cooking app 401 store platform enables the machine to order the items through the vendor listings available. The machine chooses the best option or based on user preferences considering all the parameters, based on forecast of required items vs availability. The platform is also configured to manage the payments involved in the ordering. According to an embodiment herein, the cooking machine 406 is configured to optionally have an external facing side in addition to or instead of internal ingredient feeding system. This allows vendors to re-fill or replenish the contents without user intervention. The external interface is also configured to have user inputs or other interfaces to authenticate, verify and validate the supplied ingredients.

According to an embodiment herein, the sensors 407 are used for determining the condition, quantity, quality of the ingredients stored and purchased to see if it meets the usage condition. If it is deemed unusable, it is ejected through the waste output section.

According to an embodiment herein, the machine has several compartments maintained at different conditions. As illustrated in the FIG. 4, there are several cartridges inside each of these compartments. These cartridges contain the food items. The vendors are enabled to deliver these cartridges using the external facing area described in the structure of the cooking machine.

The level of the ingredients is measured using a combination of inputs from Electronic weighing scale based on load cells and Image analysis. For conducting an image analysis, the system has camera module or the mobile phone or computing system has camera to take/capture the snapshots of the current contents and extract features such as filled vs empty also using historical knowledge of patterns when the contents is at different kevel.

Figure 5:
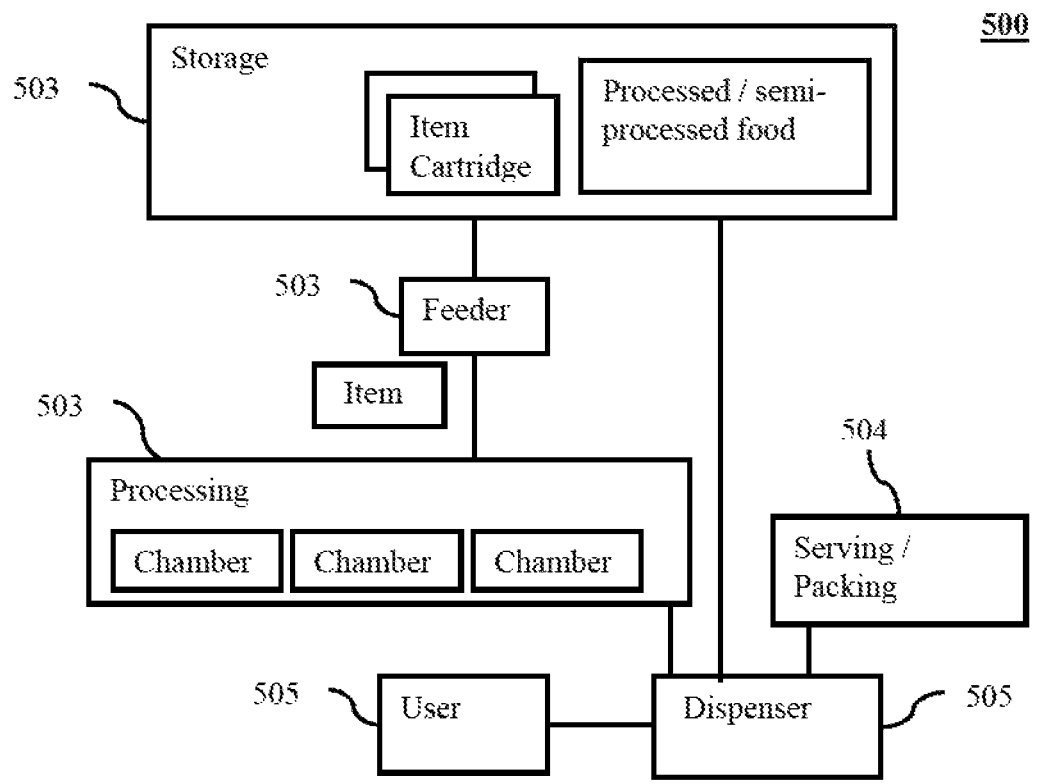
FIG. 5 illustrates a block diagram of a pre-processing system for the ingredients before preparing the food, according to an embodiment of the embodiments herein.

FIG. 5 illustrates the pre-processing of the ingredients before preparing the food, according to an embodiment herein.

According to an embodiment of the present the storage section 501 of the cooking machine is responsible for maintaining ingredients as well as semi-processed food and processed food in the specific conditions required and for moving the usable things to trash.

According to an embodiment herein, the feeder 502 moves the required items as per the instruction of the computing system, a specific quantity into a vessel that is moved across the preparation chambers. This method is also inverted by moving the preparation chambers around the food item in a vessel.

The preparation chambers 503 allow items to be prepared by supporting a specific type(s) of preparations on the item. For example, heating, boiling, cooling, spraying, microwave, baking, cooking, even cleaning, dish washing, etc.

The dispenser 506 dispenses the food after the preparation, either in the packed form or in a form where it is consumed immediately. According to an embodiment herein, the dispenser takes care of the presentation, branding, etc. The dispensing of packaged food also helps in deploying the cooking machine in public places, where it is a shared kitchen for many or even deployed in restaurants.

The user 505 who has ordered the food in the machine. A user is a personal owner of the machine or a user authorized on a shared machine or a customer of a food outlet.

The compartments 504 store the plates, cups, boxes for dispensing. According to an embodiment herein, the compartments 504 are operated manually or automatically by leveraging on the platform electronic store, where vendor replenishes this.

The system is configured to also assess the market conditions, such as ordering on a weekday through an online system is more economical, so the system is configured to batch and queue and order at the appropriate time.

The system also has provision with a small opening, which is even exposed, outside the house. This enables electronic store vendor to bring the items that the machine ordered and load into the system. He authenticates himself (Step 1), Provides the order details (Step 2), Feeds in the ingredient code that was provided by the machine during ordering (Step 3), and The machine brings in a barrel or a feeder to the barrel, which is configured to accept the ingredient (Step 4).

The ingredient is loaded in formats of a cartridge, for example, minced meat cartridge, is a cartridge of water, or emptied as it is inserted into the feeder. For example, inserting five tomatoes. In all of these steps, the machine keeps record of the perishable time either from its internal database or from the input from the store. For example, if the tomatoes, are able to last for 3 days, the machine disposes them and plans on reordering based on the knowledge. Intermediate visual inspections and even smell and texture based inspects are carried out by the machine.

During idle condition, the machine recognizes the type of storage of each of the ingredient and makes use of the appropriate chambers to achieve the same. For e.g. tomatoes if needed to be stored at 15 degree C. moves the barrel into refrigerator, which is enabled to keep it at 15° C. In some cases, the machine also decides to use the refrigerator for handling multiple tasks, such as first move the barrel with tomatoes, achieve temperature of 12.5, then move it out, bring in a barrel of say carrot, bring it to 12.5 degrees, and move these barrels out. Wait until temperature hits 16 again and redo the operation.

The machine is connected and not connected to a common network. If it is connected, the system is configured to take advantage of the data and information in the other machines. The central authority as in FIG. 4 is configured to moderate these.

The machine has a user interface where the user is enabled to order for what he wants. During the ordering process, the machine lets him browse through all the items that are to be cooked out of the available ingredients. The machine uses a configurator to decide on what is to be cooked accommodating constraints such as Quantity required, Ingredients available. Time available, Storage required etc.

This selection is not only be done using the system display but also done on a remote unit such as a mobile phone or a PC, which relays this information to the cooking machine.

The cooking machine also has a camera and biometric capabilities to identify a user so that it recognizes his preferences in suggesting the items. Apart from selecting from preloaded recipes, the system is configured to download recipes, which is offered in paid form or free by the peer cloud or the central communication platform.

The system also permits gifting recipes or items. For e.g. mom gifts a special cake by picking a recipe (or creating it) and pushing it to the target ID of his son who lives several thousand kilometers away. In the gifting process, the system even allows mom to pay for the ingredients that is ordered by the machine to cook the item she forwarded. This way it is remotely possible to send the cooked food.

The system use the same model for even restaurants which is in virtually in the cloud. If a user orders five roti and one dhal curry to the restaurant using the virtual menu card, they use the ingredients in the machine and their unique recipe and make the dish.

The cloud platform even helps in supporting models where the restaurant is able to order or replenish the used ingredients by covering the cost of ordering them to the machine, which is batched/grouped in batches.

The system is configured to understand the health condition of the user and suggest menus for the user. This is applicable for one menu or a menu for a period.

The machine is equipped with sensors to measure body content such as water, fat, sugar, and the like, and even decide on the right food items.

The machine is equipped with technologies to even assist in location so that the delivery mechanisms for external suppliers are accomplished.

The same cooking machine is also called as a Cooking (Ro) Bot and applications used not only in home but also even in office or in public areas.

One of the features that are interesting in a many user scenario is the ability for the machine to account for the ingredients used for one cooking cycle or even for a month. For e.g. the machine is configured to maintain a statement of account for each employee of the ingredients used based on the ordering carried out by them.

Figure 6:
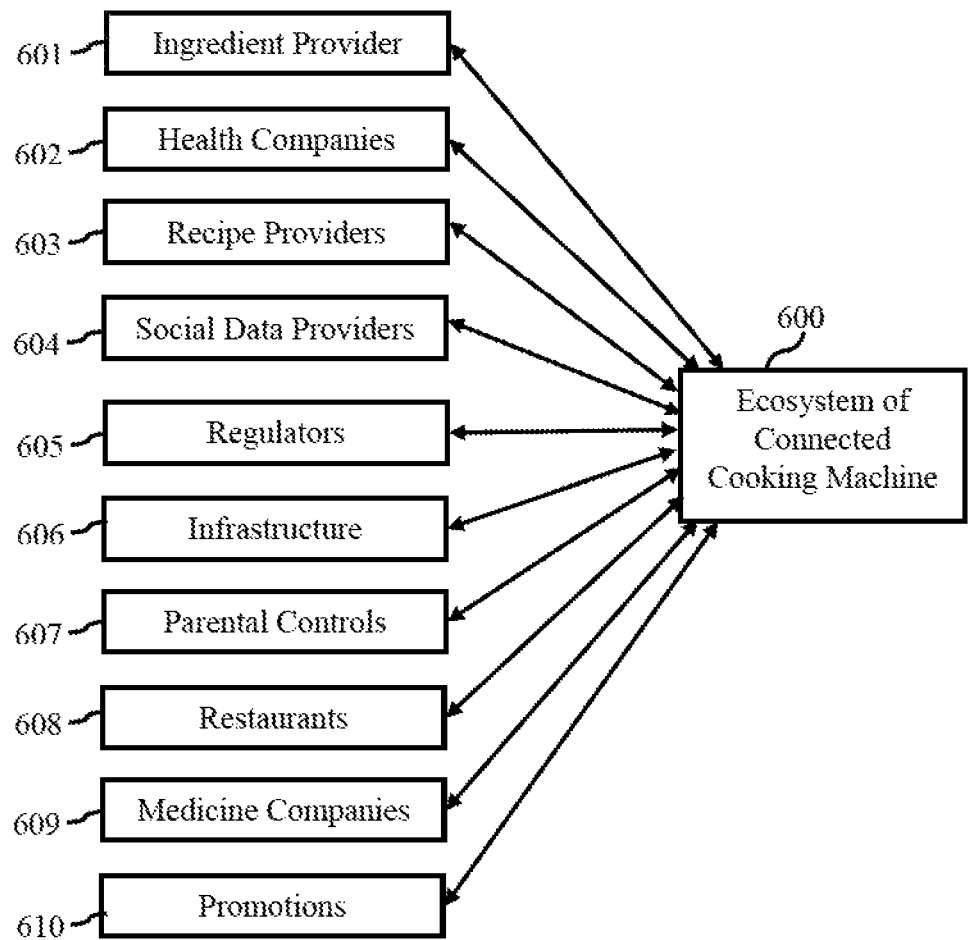
FIG. 6 illustrates a block diagram of a plurality of interfaces communicatively connected to the cooking machine, according to one embodiment of the embodiments herein.

FIG. 6 illustrates a plurality of interfaces to the cooking machine, according to one embodiment of the embodiments herein. An Ecosystem of Connected Cooking Machine 600 comprises the inputs from a plurality of sources such as Ingredient Provider 601, Health Companies 602, Recipe Providers 603, Social Data Providers 604, Regulators 605, Infrastructure 606, Parental Controls 607, Restaurants 608, Medicine Companies 609 and Promotions 610.

Figure 7:
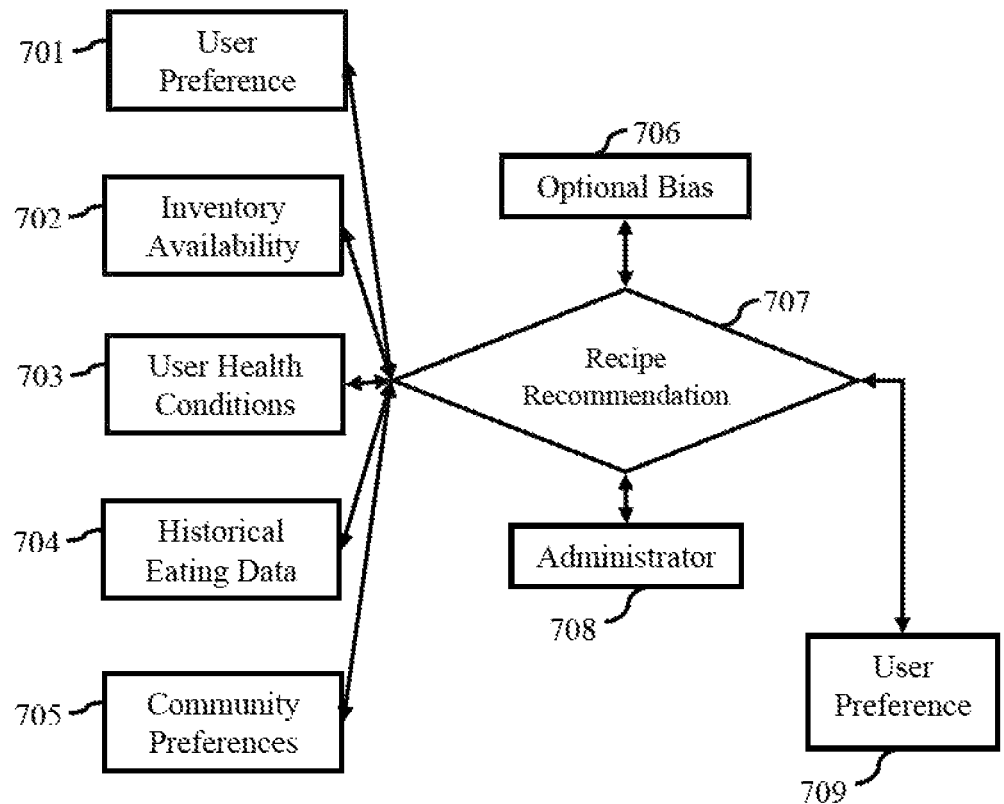
FIG. 7 illustrates a functional block diagram of a system for recipe recommendation, according to an embodiment of the embodiments herein.

FIG. 7 illustrates the process of recipe recommendation, according to an embodiment of the embodiments herein. A Recipe Recommendation module 707 is provided with a plurality of inputs such as User Preference 701, Inventory Availability 702, User Health Conditions 703, Historical Eating Data 704 and Community Preferences 705. The Recipe Recommendation module 707 also takes inputs from Optional Bias module 706 and Administrator module 708 to provide a User Preference 709.

Figure 8:
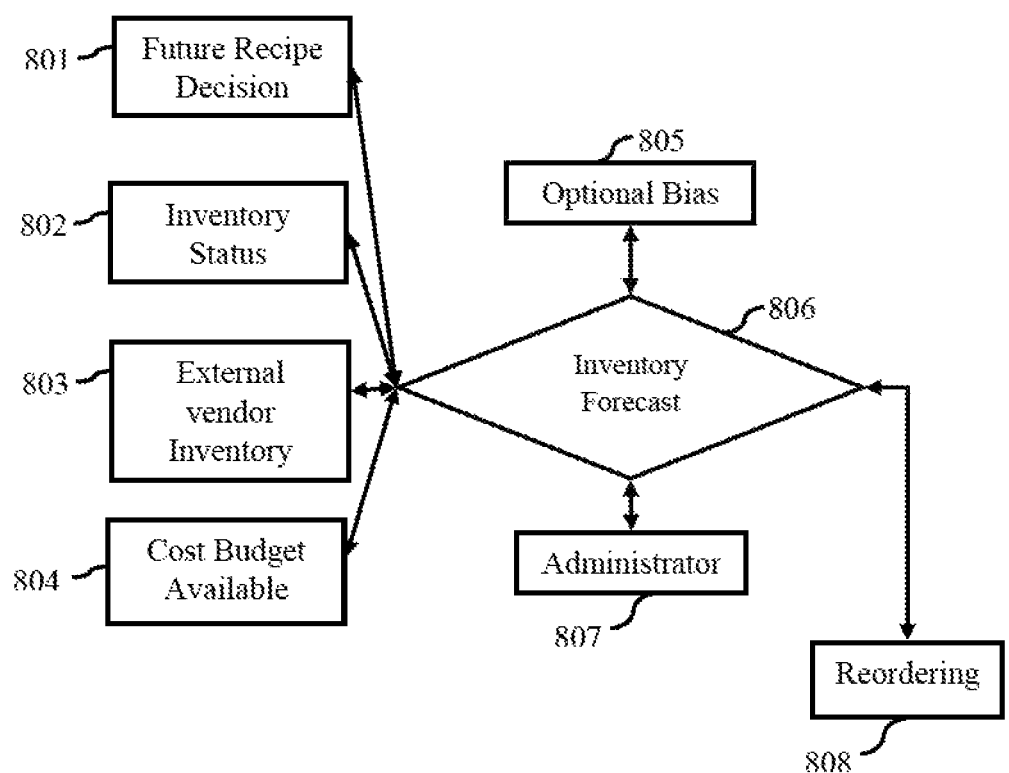
FIG. 8 illustrates a functional block diagram of a system for inventory forecast, according to an embodiment of the embodiments herein.

FIG. 8 illustrates the process of inventory forecast, according to an embodiment of the embodiments herein. An Inventory Forecast module 806 is provided with a plurality of inputs such as Future Recipe Decision 801, Inventory Status 802, External vendor Inventory 803 and Cost Budget Available 804. The Inventory Forecast module 806 also takes inputs from Optional Bias module 805 and Administrator module 807 to provide a Reordering 808 of ingredients.

Figure 9:
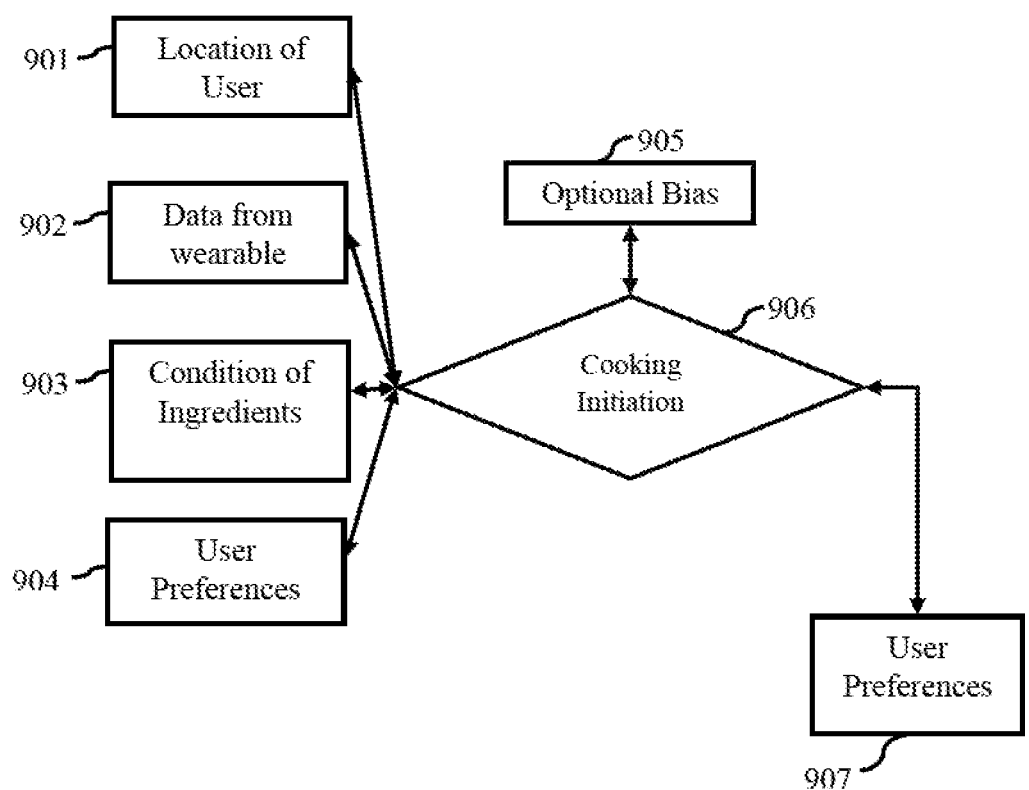
FIG. 9 illustrates a functional block diagram of a system for executing the process of decision on cooking instantiation, according to an embodiment of the embodiments herein.

FIG. 9 illustrates the process of decision on initiating the cooking process, according to an embodiment of the embodiments herein. A Cooking Initiation module 906 is provided with a plurality of inputs such as Location of the User 901, Data from Wearable 902, Condition of Ingredients 903 and User Preferences 904. The Cooking Initiation module 906 also takes inputs from Optional Bias module 805 to provide User Preferences 907.

Figure 10:
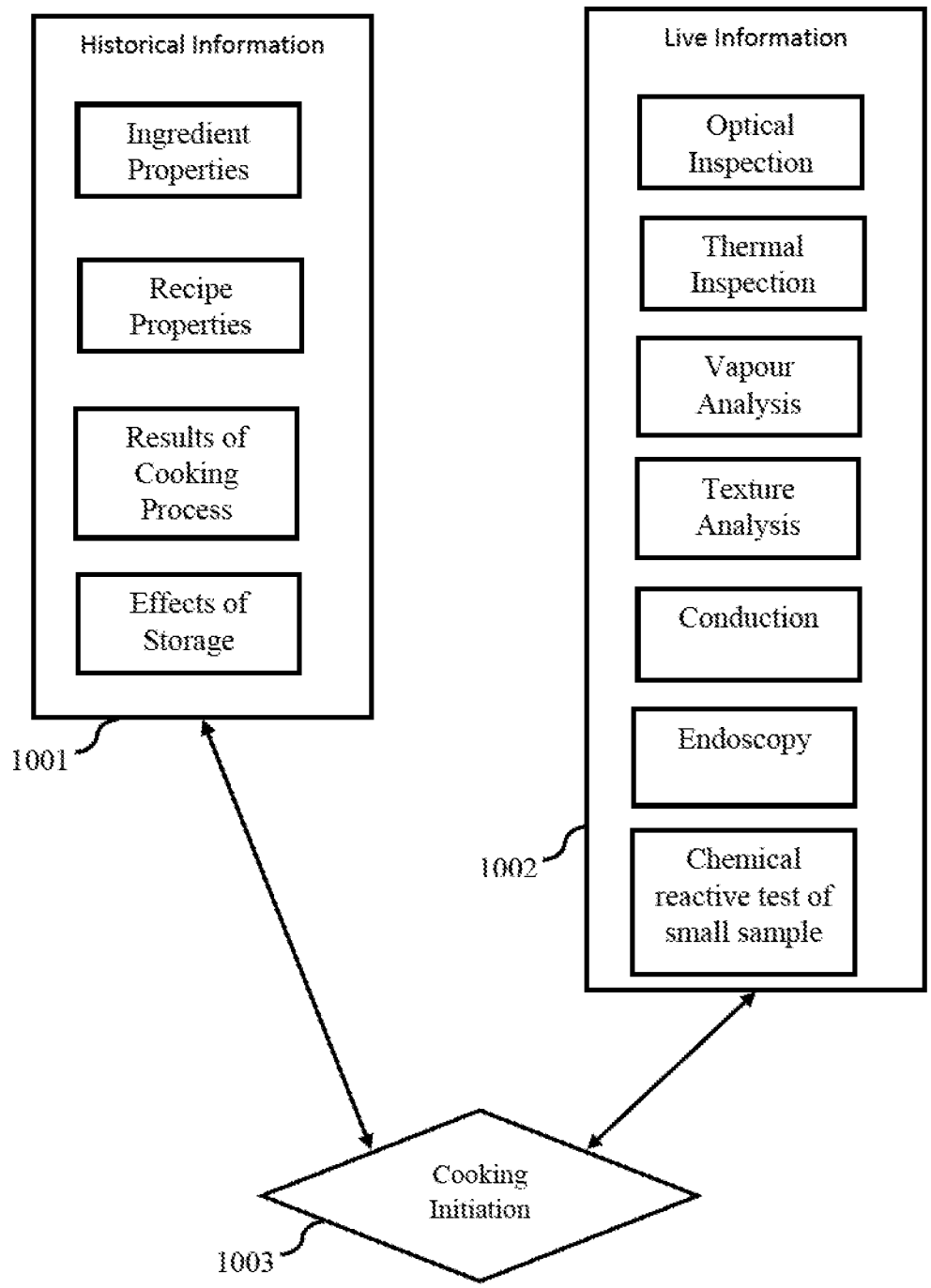
FIG. 10 illustrates a functional block diagram of a system for pre-processing the ingredients before preparing the food, according to an embodiment of the embodiments herein.

FIG. 10 illustrates the pre-processing of the ingredients before preparing the food, according to an embodiment of the embodiments herein. A Cooking Initiation module 1003 receives inputs from Historical Information module 1001 and Live Information module 1002. Historical Information module 1001 comprises information such as Ingredient Properties, Recipe Properties, Results of Cooking Process and Effects of Storage. Live Information module 1002 comprises information from a plurality of live processes such as Optical Inspection, Thermal Inspection, Vapour Analysis, Texture Analysis, Conduction, Endoscopy and Chemical Reactive test of small sample.

According to an embodiment herein, there are three sources of input on historical data collection of the food/nutrient consumption. The data from the usage of the networked cooking machine themselves is the first source. The user has already used cooking machine at work or home or at different locations. Each machine reports to the central cloud based infrastructure on the food prepared and the inputs in that content which is used in estimation.

The second source is the external devices that track user consumption. For example, networked spoon or a wearable watch that detects the number of times the user performed the action of taking food from container to his mouth.

The third is the biometric wearable devices, which is configured to report the nutrient levels. An example is heart rate, ECG, blood sugar levels of users. The present disclosure does not focus into these methods. These is further augmented with the actual input of the user himself. For example, networked spoon or a wearable watch that detects the number of times the user performed the action of taking food from container to his mouth.

According to an embodiment herein, there are two methods of how the nutrient levels are measured. In the first method, each cartridge that contains the food item comes with the information about the nutrient levels of the contents stored. This is programmed by the supplier of the nutrient.

The second method is by inspection of the properties of the material by evaluating parameters such as color, texture and electrical conductivity. These measurements are compared with historically stored patterns of ingredient type data. For eg. Tomatoes with conductivity of x is mapped with historical data in the cloud.

The various embodiments of the embodiments herein provide an automatic food preparation and management system that is distributed across a plurality of geographic locations. The various embodiments herein provide a method and a system for having a shared kitchen or a virtual restaurant, which aggregates recipes from multiple chefs or food providers and prepares food instantly of based on a schedule chosen by users. The various embodiments herein provide a method and a system for understanding, grouping, classifying, targeted advertising, match making, and friend recommendation based on cooking and eating preferences. The system also comprises an automatic inventory management module is configured to manage the availability of a plurality of ingredients for preparation of food. The inventory management module is also configured to receive the information about the availability of ingredients in a plurality of storage locations through the sensors module. The inventory management module is configured to receive the information about the type of food the system is scheduled to cook and automatically alert the end-point devices about the availability of the ingredients. The inventory management module is enabled to order the ingredients through online e-commerce websites and provide the location to which the ingredients are to be delivered. The recipe and menu building module is configured to receive the information about the food intake pattern of a user, amount of nutrients taken by the user and the vital health parameters of the user through a plurality of sensors that are remotely located and connected to the cloud computing module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. An automatic food preparation and management system that is distributed across a plurality of geographic locations, the system comprising:
   a hardware processor;
   a memory module, wherein the memory module comprises a plurality of digital data storage devices for storing digital data for automatic food preparation and management;
   an analytics module, wherein the analytics module is stored in the memory module;
   a plurality of end-point devices, wherein the plurality of end-point devices comprise kitchen appliances and food processing machines located in a plurality of geographical locations, and wherein the plurality of end-point devices comprise kitchen appliances that are connected to the cloud computing module, and wherein the plurality of end point devices are configured to receive a plurality of instructions from the analytics module and cook-food, and wherein the kitchen appliance has a plurality of processing chambers, and wherein the plurality of processing chambers are configured to process the ingredients to perform heating, boiling, cooling, spraying, baking, cooking, cleaning, dish washing operations, and moved the ingredients from one chamber to next, based on conditions, and wherein the conditions include time, input from a plurality of sensors in a sensor module, and wherein all the end-point devices are configured to work independently and in coordination with other end-point devices, and the kitchen appliance has a user interface where the user is enabled to order for what he wants, and wherein the kitchen machine enables the user to browse through all the items that are to be cooked out of the available ingredients during the ordering process, and wherein the kitchen appliance has machine a configurator to decide on what is to be cooked accommodating constraints that include Quantity required, Ingredients available, Time available, and Storage required, wherein the kitchen appliance has a camera and biometric capabilities to identify a user to recognizes his preferences in suggesting items;
   a cloud computing module, wherein the cloud computing module connects the plurality of end-point devices, and wherein the system enables gifting recipes or items so that a mom is enabled to gift a special cake by picking a recipe (or creating it) and pushing it to the target ID of his son who lives several thousand kilometers away, and wherein the system even enables mom to pay for the ingredients that is ordered by the machine to cook the item she forwarded thereby enabling a to send the cooked food remotely, and wherein the cloud computing module helps in supporting models thereby enabling a restaurant to order or replenish the used ingredients by covering the cost of ordering them to the machine, which is batched/grouped in batches;
   communication module, wherein the communication module is configured to establish communication between the plurality of end-point devices;
   a plurality of sensors connected to the analytics module, the cloud computing module and the communication module;
   an inventory management module, wherein the inventory management module is connected to the analytics module, the cloud computing module and the communication module, and wherein the inventory management module keeps record of a perishable time either from its internal database or from the input from the store, and wherein the inventory management module is configured to dispose a perishable item and place an order based on a record of time; and
   a recipe and menu building module, wherein the recipe and menu building module is connected to the analytics module, the cloud computing module and the communication module, and wherein the recipe and menu building module is run on the hardware processor, and wherein the recipe and menu building module is configured to receive an information related to a food intake pattern of a user, an amount of nutrients taken by the user and a plurality of vital health parameters of the user through the plurality of sensors that are remotely located and connected to the cloud computing module;
   a Cooking Initiation module configured to receives inputs from a historical information module and a Live information module, and wherein Historical Information module comprises information comprising Ingredient Properties, Recipe Properties, Results of Cooking Process and Effects of Storage, and wherein Live Information module comprises information from plurality of live processes comprising Optical Inspection, Thermal Inspection, \vapour Analysis, Texture Analysis, Conduction, Endoscopy and Chemical Reactive test of small sample.

2. The system according to claim 1, wherein the analytics module is run on the processor, and wherein the analytics module is configured to analyse the inputs from the plurality of sensors and the plurality of end-point devices, and wherein the analytics module is configured to decide the type of food to be prepared by the system based on the inputs from the plurality of sensors and the plurality of end-point devices.

3. The system according to claim 1, wherein the analytics module is configured to send a plurality of instructions to the plurality of end-point devices through the communication module.

4. The system according to claim 1, wherein the plurality of end-point devices are provided with add-on modules that are configured to connect the plurality of end-point devices to the system through the cloud computing module.

5. The system according to claim 1, wherein the sensors module comprises the plurality of sensors that are configured to measure an availability of a plurality of ingredients required to cook food, and wherein the sensors module also comprises the plurality of sensors for measuring the food and nutrition intake of a plurality of humans and to provide the information regarding the food and nutrition intake to a processing module and the cloud computing module.

6. The system according to claim 1, wherein the plurality of sensors comprises audio, visual and biometric sensors that are configured to communicate the sensor output to the cloud computing module.

7. The system according to claim 1, wherein the inventory management module is run on the hardware processor, and wherein the inventory management module is configured to manage or control and regulate an availability of a plurality of ingredients required for a preparation of food, and wherein the inventory management module is configured to receive an information about the availability of the plurality of ingredients in a plurality of storage locations through the sensors module, and wherein the inventory management module is configured to receive an information related to a type of food scheduled to be cooked by the system, and wherein the inventory management module is configured to automatically alert the plurality of end-point devices regarding the availability of the plurality of ingredients.

8. The system according to claim 1, wherein the inventory management module is configured to place an order for purchasing a plurality of ingredients through online e-commerce websites and notify a location for delivery of the plurality of ingredients purchased.

9. The system according to claim 1, wherein recipe and menu building module is configured to receive an information regarding an availability of a plurality of ingredients at a location of the users, and wherein the recipe and menu building module is configured to prepare a personalized menu of food for every user depending on the availability of the plurality of ingredients and a plurality of health parameters of a user, and wherein the recipe and menu building module is configured to provide a recipe of a food to be prepared and a plurality of instructions for preparing the food to the plurality of end-point devices through the analytics module.

* * * * *